Sept. 18, 1945.  J. MERCIER  2,385,017
BRANCH PIPE ATTACHING DEVICE
Filed Aug. 19, 1943    2 Sheets-Sheet 1
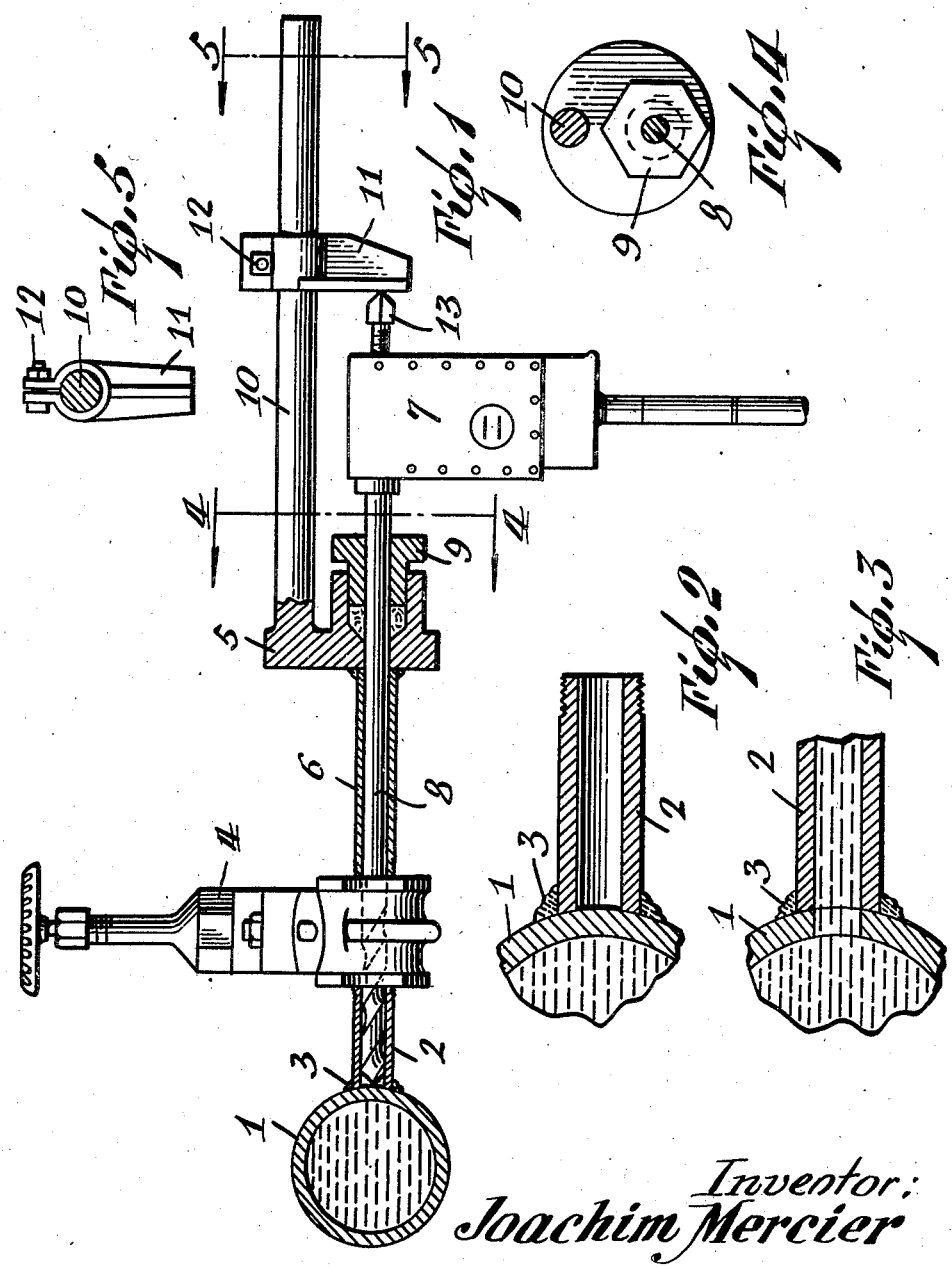
Inventor:
Joachim Mercier
By ⟨signature⟩
Attorney

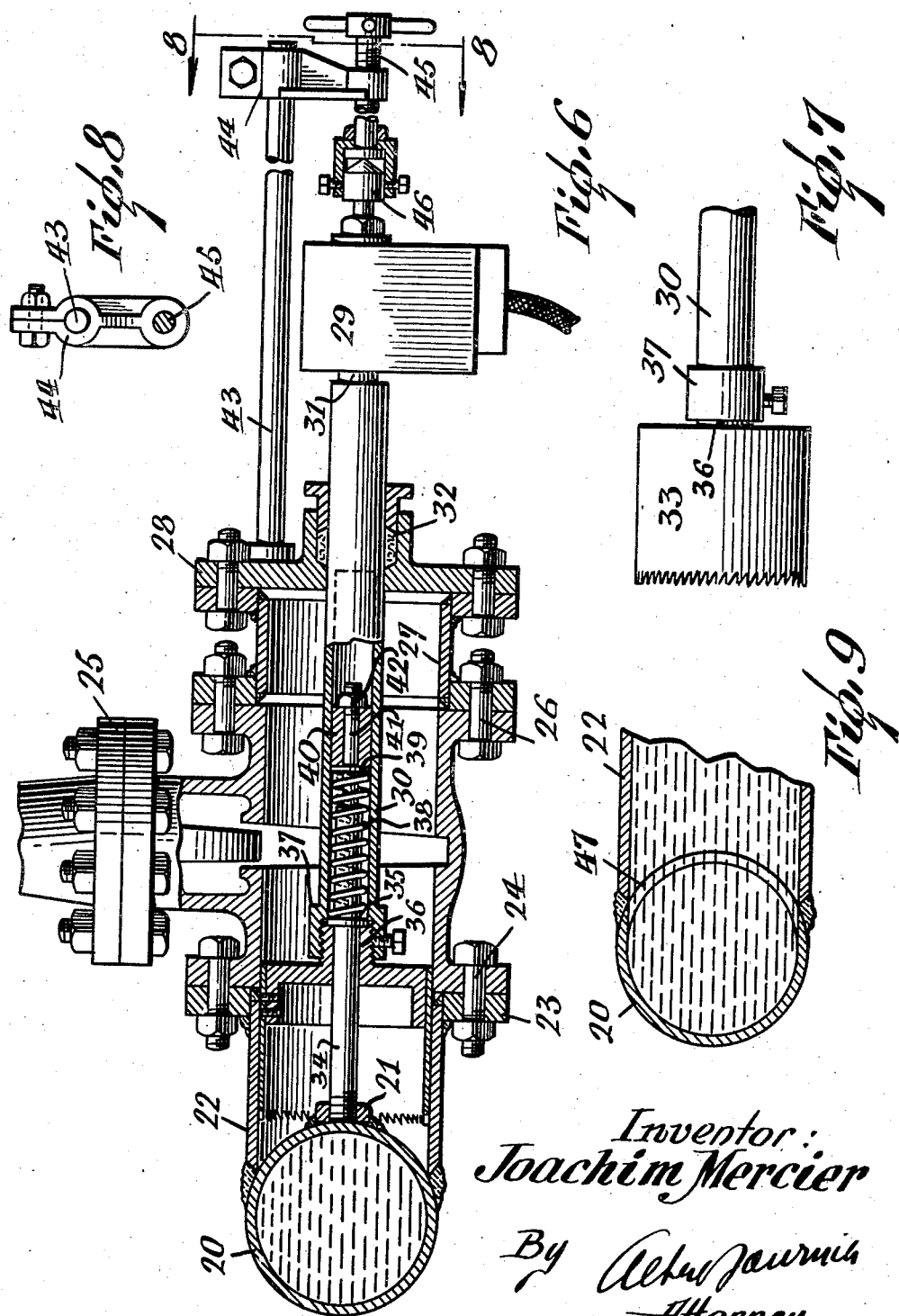

Patented Sept. 18, 1945

2,385,017

UNITED STATES PATENT OFFICE 2,385,017

BRANCH PIPE ATTACHING DEVICE

Joachim Mercier, Arvida, Quebec, Canada

Application August 19, 1943, Serial No. 499,265

1 Claim. (Cl. 77—42)

The present invention pertains to a novel apparatus for and method of attaching a branch to a fluid pipe while the latter is in service, or without requiring interruption of the flow.

This object is accomplished by first securing a nipple to the area of the pipe where the branch connection is to be made. A valve is applied to the nipple and adjusted to open position. A cutting tool is then passed through the valve and nipple and applied to the pipe and is preferably guided in a tube attached to the other side of the valve.

When a hole has been cut in the pipe, the tool is withdrawn and the valve closed. If a guide tube has been used for the tool, it is also removed. The branch connection is then attached to the face side of the valve which, with the nipple, remains as a permanent part of the installation.

Another object of the invention is to provide means for retrieving the cut-out part of the pipe without permitting it to fall into the pipe. This device is useful more especially with larger sizes of pipe that require a cylindrical saw for cutting the hole.

The invention is fully disclosed by way of example in the following description and in the accompanying drawings in which:

Figure 1 is a side elevation, partly in section of the device applied to a pipe;

Figure 2 is a detail section of the pipe before the connection has been made;

Figure 3 is a similar section after the connection has been made;

Figures 4 and 5 are sections on the lines 4—4 and 5—5 respectively of Figure 1;

Figure 6 is an elevation, partly in section of a modified installation;

Figure 7 is a detail elevation thereof;

Figure 8 is a section on the line 8—8 of Figure 6, and

Figure 9 is a detail section of the pipe after the connection has been made.

Reference to these views will now be made by use of like characters which are employed to designate corresponding parts throughout.

In Figure 1 is shown a fluid pipe 1 to which a branch connection is to be made. The fluid may be liquid, air, steam or other gas. A nipple 2 is soldered at 3 to the portion of the pipe where the connection is to be made. A gate valve 4 is applied to the nipple and opened.

A drill support on head 5 is mounted at a suitable distance from the valve and is preferably joined to the valve by a tube 6 suitably fastened to both parts and in line with the nipple 2. A drill 7 is mounted so that its bit 8 passes through a bushing 9 in the head and into the tube 6 and valve 4 towards the pipe 1. The drill may be operated by air, electricity or a ratchet, as desired.

A guide rod 10 extends from the head 5 and carries a backing plate 11 adjustably clamped thereon at 12. When the drill is run, the bit is advanced by the engagement of the plate 11 against a stem 13 of the drill, in a manner well known in the art.

The bit finally drills a hole 14 in the pipe 1, as shown in Figure 3. The plate 11 is then released and retracted to permit the drill to be withdrawn. The valve 4 is then closed and the tube 6 removed. Finally the branch pipe (not shown) is connected into the valve. Thus, the branch connection is made while the pipe 1 is in service and without interruption of the flow therein.

The modification shown in Figures 6 to 9 is for larger pipe on the order of a three inch diameter. The pipe 20, first has a nut 21 soldered thereto where the connection is to be made. Next a nipple 22 is soldered on the pipe concentric with the nut. The nipple carries a flange 23 to which is attached, by bolts 24, one side of the gate valve 25. To the other side of the valve is bolted at 26 a short tube 27, and to the latter is attached a drill support 28.

The drill 29 for cutting the pipe 20 drives a tube 30 from its spindle 31. The tube is passed through a packing 32 in the support 28 and carries a cylindrical saw 33 beyond the valve. Obviously the saw and parts hereinafter described are not assembled in the stated order but rather in a practical sequence before mounting the support 28.

A rod 34 is threaded into the nut 21 as one of the initial operations. A washer 35 is clamped on the rod by the hub 36 of the saw and the cupped end 37 of the tube 30. A coil spring 38 surrounds the rod behind the washer and is backed by another washer 39, and a sleeve 40 on the reduced end 41 of the rod. A nut 42 threaded on the reduced end bears against the sleeve and adjusts the spring.

From the support 28 extends a guide rod 43 carrying an adjustable plate 44 in the manner previously described. A screw 45 is threaded in the plate and is maintained in engagement with the stem of 46 of the drill. Constant adjustment of the screw 45 may be necessary because of the length of the driving tube 30.

The spring 38 is forced back by nut 42 and finally withdraws the severed piece of pipe, as will now be shown. For a 6" pipe the spring should be initially be compressed about 1½" by the nut 42, since the saw must travel more than the pipe radius in cutting the hole. The tension of the spring should, of course, be sufficient to support the weight of the severed piece of pipe. When the saw has cut out 1½" the spring 38 is loosened and thence will be pulled with sleeve 40 in sliding in tube 30. When the saw has completely pierced the pipe, the severed piece will remain in the saw 33 since spring has been expanded for about 1½" thus preventing the piece from dropping into the pipe.

The hole is indicated by the numeral 47 in Figure 9. Finally, the tube 27 is removed from the valve 25 and replaced by the remainder of the desired branch connection.

Although specific embodiments of the invention have been illustrated and described, it will be understood that various alterations in the details of construction may be made without departing from the scope of the invention as indicated by the appended claim.

What I claim as my invention is:

An apparatus for cutting a pipe for a branch connection while in service, comprising a nipple adapted for attachment to a pipe, a valve body at one end of said nipple and formed with a valve seat, a valve head movable transversely of said body and adapted to close on said seat, a rod adapted for attachment to the pipe and disposed within said nipple, a cutting tool slidably mounted on said rod and adapted to pass through said seat and nipple, a spring between said rod and tool, whereby to prevent separation of the rod from the tool, a tube fixed to said tool and enclosing said spring and packed in an end of said valve body, and means for rotating said tube.

JOACHIM MERCIER.